(12) United States Patent
Blanchard

(10) Patent No.: US 10,125,508 B2
(45) Date of Patent: Nov. 13, 2018

(54) SWIMMING POOL FUNNEL

(71) Applicant: Tod Blanchard, Litchfield, NH (US)

(72) Inventor: Tod Blanchard, Litchfield, NH (US)

( * ) Notice: Subject to any disclaimer, the term of this patent is extended or adjusted under 35 U.S.C. 154(b) by 0 days.

(21) Appl. No.: 15/435,840

(22) Filed: Feb. 17, 2017

(65) Prior Publication Data
US 2018/0238066 A1    Aug. 23, 2018

(51) Int. Cl.
*E04H 4/12*      (2006.01)
*C02F 1/00*     (2006.01)
*C02F 103/42*  (2006.01)

(52) U.S. Cl.
CPC ......... *E04H 4/1281* (2013.01); *E04H 4/1209* (2013.01); *C02F 1/00* (2013.01); *C02F 2103/42* (2013.01)

(58) Field of Classification Search
CPC . E04H 4/1281; E04H 4/1209; C02F 2103/42; C02F 1/00
USPC ......... 210/167.1, 167.11, 749; 137/331, 333, 137/334, 340
See application file for complete search history.

(56) References Cited

U.S. PATENT DOCUMENTS

| 1,487,824 | A |   | 11/1922 | Vincent |  |
|---|---|---|---|---|---|
| 1,738,834 | A | * | 12/1929 | Kelly | A23C 3/031 137/209 |
| 3,750,722 | A |   | 8/1973 | Nowak |  |
| 5,518,635 | A | * | 5/1996 | Kohlman | C02F 1/685 210/167.11 |
| 7,934,516 | B1 | * | 5/2011 | Jaynes | E03D 11/16 137/312 |
| 2011/0132262 | A1 | * | 6/2011 | Powell | C23C 14/228 118/726 |
| 2014/0144849 | A1 | * | 5/2014 | Wojtaszczyk | E04H 4/1209 210/744 |
| 2016/0325401 | A1 | * | 11/2016 | Meyer | B24B 57/02 |

OTHER PUBLICATIONS

SP Scienceware, Funnel Offset 1Qt. Mfr. # 14820-0000, Zoro # G8544426, Mfr. # 14820 (last visited Jan. 19, 2017).
amazon.com, Lubeq 02562 1.5 Qt. Plastic Funnel With Detachable Offset Spout (last visited Jan. 19, 2017).
amazon.com, Lisle 17232 Right Angle Funnel (last visited Jan. 19, 2017).

* cited by examiner

*Primary Examiner* — Fred Prince
(74) *Attorney, Agent, or Firm* — Robert R. Deleault, Esq.; Mesmer & Deleault, PLLC

(57) ABSTRACT

A swimming pool funnel includes a hollow funnel body extending along a central funnel axis from a first open end to a second open end, where the first open funnel end is greater in perimeter size than the second open funnel end and the funnel body reduces in cross-sectional size between the first open funnel end and the second open funnel end. An elongated spout made of rigid material is connected at its proximal end to the second open funnel end of the funnel body and extends along a central spout axis to a distal spout end defining an opening. The central funnel axis and the central spout axis define a body angle from 100 to about 150 degrees.

18 Claims, 5 Drawing Sheets

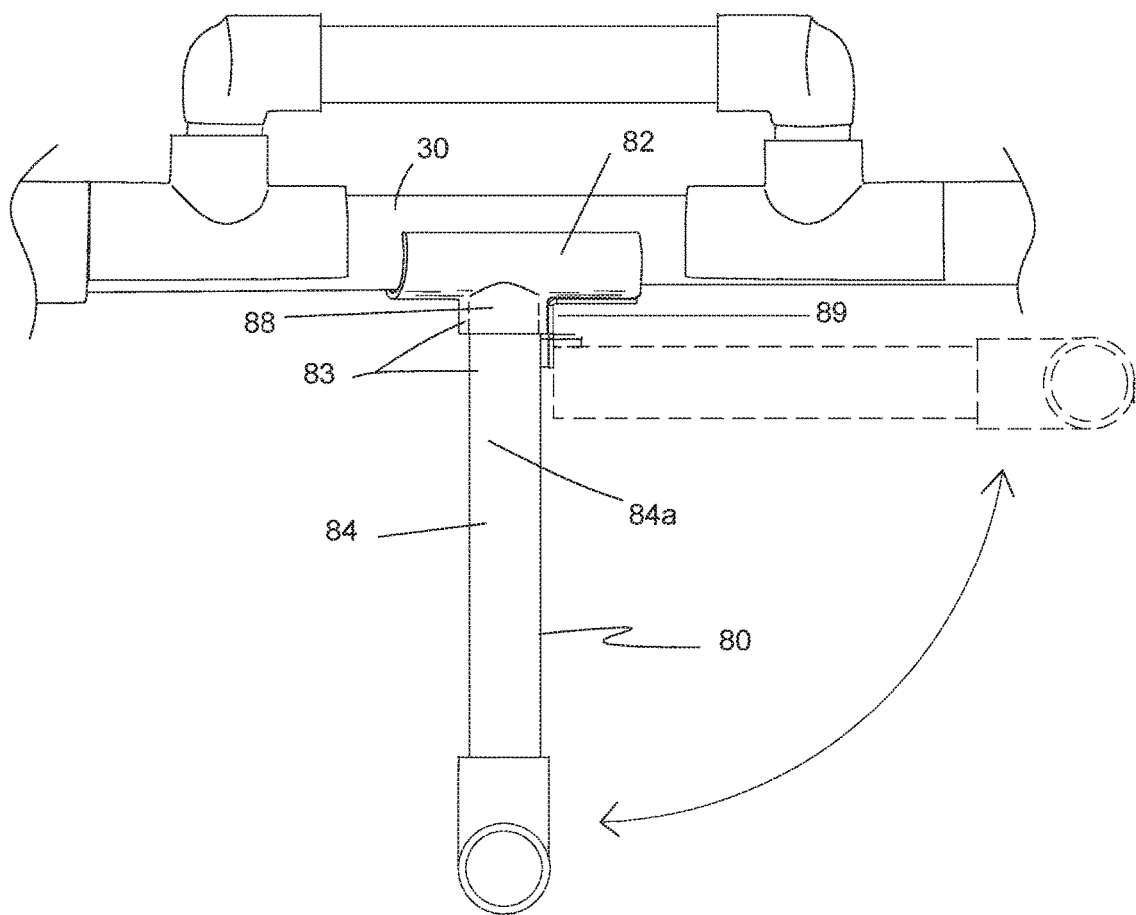

SWIMMING POOL FUNNEL

BACKGROUND OF THE INVENTION

1. Field of the Invention

The present invention relates generally to maintenance equipment for swimming pools. More particularly, the present invention relates to a funnel for use with maintaining swimming pools during the off-season.

2. Description of the Prior Art

For outdoor swimming pool owners in parts of the country with cold winter seasons, it is necessary to close the swimming pool in the fall. Typically, the close-down procedure includes adding chemicals to the pool and then installing a cover over the water to prevent leaves and debris from entering the pool.

Some owners prefer to install a solid cover. Others use a mesh cover, also known as a safety cover. In either case, the pool cover extends over the water and is secured around the perimeter of the pool using straps on the pool cover that attach to anchors embedded in the concrete deck surrounding the pool. Stainless steel springs connect the straps to the anchors and pull the pool cover tight. Due to the tension on the straps, the pool cover is installed and removed using a special tool.

A solid cover prevents water from entering or leaving the pool, but can be damaged in cold climates due to the weight of snow and ice collecting on the cover. Covers with a mesh construction allow for water drainage into or out of the pool while keeping unwanted leaves and large debris out.

SUMMARY OF THE INVENTION

Mesh pool covers are preferred because they don't allow water to collect on the cover, which can pull the cover down into the water. However, the mesh material allows sunlight to reach the water and therefore promotes algae growth in still water. When spring arrives and the pool owner wishes to re-open the pool for swimming, the green water must be treated and the pool cleaned of algae. Removing algae from a pool requires scrubbing the sides and floor of the pool, cleaning the pool with chemicals, and back-flushing the filters to remove algae from the filtration system. The clean-up process requires extra work and expense for the pool owner.

To prevent algae growth, bleach (sodium hypochlorite (NaClO)) can be added to the pool water periodically during the winter months. However, pouring bleach through a mesh cover can change the color of the cover and bleach makes the cover brittle where it contacts the cover. To avoid damaging and shortening the life of an expensive pool cover, pool owners usually avoid pouring chemicals through a mesh cover.

To avoid destroying the cover with bleach, some pool owners release the cover straps around the pool so they can add chemicals directly to the water. Due to the difficulty of releasing and refastening the straps, especially in cold weather, some owners are not able to reattach the cover and therefore avoid removing it to add chemicals. Often the difficulty in removing and installing the pool cover results in failing to treat the water to avoid algae growth.

Thus, a need exists for a device to introduce bleach and other chemicals to a covered pool without removing the pool cover. To address these and other problems, the present invention is directed to a funnel configured to introduce chemicals to a covered pool and a method of pool maintenance.

One aspect of the present invention is directed to a funnel having a hollow funnel body extending along a central funnel axis from a first open funnel end to a second open funnel end. The first open funnel end of the funnel body is greater in perimeter size than the second open funnel end and the funnel body reduces in cross-sectional size between the first open funnel end and the second open funnel end. An elongated spout made of a rigid material is connected at a proximal spout end to the second open funnel end of the funnel body. The spout extends along a central spout axis to a distal spout end defining an opening. The central funnel axis and the central spout axis define a body angle from 100 degrees to about 150 degrees.

In some embodiments, the distal spout end has a hollow funnel outlet tip extending along a tip axis that defines a tip angle from about 100 to 150 degrees, where the funnel outlet tip directs fluid to exit the spout along the tip axis. In some embodiments, the tip angle is the same as the body angle. For example, the tip axis is parallel to the central spout axis and spaced apart by the spout.

In another embodiment, the funnel includes an optional handle attached to the spout between the funnel body and a midpoint of the spout. In one embodiment, the handle extends up from a top side of the spout.

In other embodiments, the funnel includes a funnel support fixedly or removably or hingedly attached to the spout between the funnel body and a midpoint of the spout, where the funnel support is constructed to extend transversely from the spout and elevate the funnel body above the ground with the distal spout end extending downward. In some embodiments, the funnel support is a removable leg. In some embodiments, the funnel support is a two-legged support, such as a bipod. In some embodiments, the funnel support includes at least one leg that is retained by a base secured to the spout. For example, the support leg(s) is (are) retained by the base with magnetic attraction, a slip fit between the leg(s) and the base, or threaded engagement between the leg(s) and the base. In other embodiments, the funnel support is hingedly attached to the base or the spout to allow the funnel support to swing toward the spout and connected to the spout by magnetic attraction, clips, straps, and the like for easy storage and/or transport.

In some embodiments, the spout has a length of at least three feet. In some embodiments, the funnel has an overall length less than four feet. In other embodiments, the funnel has an overall length of about 54 inches.

Another aspect of the present invention is directed to a method of adding chemicals to a covered swimming pool. In one embodiment, the method includes the steps of providing a swimming pool with a pool deck and a tensioned pool cover installed over the water using retaining structures between the pool cover and the pool deck; providing a funnel with a hollow funnel body extending along a central funnel axis from a first open end to a second open end, where the first open end is greater in size than the second open end and the funnel body reduces in cross-sectional size between the first open end and the second open end. The funnel also has an elongated spout made of a rigid material and having a proximal spout end connected to the second open end of the funnel body and extending along a central spout axis to a distal spout end defining an opening, where the central funnel axis and the central spout axis define a body angle from 100 to about 150 degrees. The method also includes the step of inserting the elongated spout between the tensioned pool cover and the pool deck without detaching any retaining structures on the pool cover and leveraging the funnel to raise an edge of a tensioned pool cover sufficiently to cause the funnel to be inclined in an upward orientation from the spout distal end to the funnel body, and pouring a quantity of liquid chemical into the funnel body through the first open funnel end, thereby dispensing the quantity of chemical into the swimming pool via the spout without releasing any portion of the tensioned pool cover from a corresponding retaining structure.

In one embodiment, the step of raising the edge of the tensioned pool cover is performed by inserting the spout between the cover and the pool deck, then lifting the pool cover using leveraging of the spout against the tensioned pool cover.

In another embodiment, the method includes the steps of positioning a funnel support, such as a leg or bipod, relative to the spout between the funnel body and a midpoint of the spout and using the support to rest the leveraged funnel onto the funnel support to maintain the incline of the funnel in an upward orientation above the pool deck. For example, the support is constructed to extend transversely from the spout and elevate the funnel body with the distal spout end extending downward.

In some embodiments, the step of providing a funnel includes selecting the funnel to include a support attached to the spout between the funnel body and a midpoint of the spout and positioning the support to elevate the funnel body above the pool deck.

In another embodiment, the step of providing a funnel includes selecting the funnel having a hollow tip on the distal spout end and extending along a tip axis that defines a tip angle with the central spout axis from about 100 to 150 degrees, where the tip directs fluid to exit the spout along the tip axis.

In another embodiment, the step of providing a funnel includes selecting the funnel to include a handle attached to the spout between the funnel body and a midpoint of the spout.

BRIEF DESCRIPTION OF THE DRAWINGS

FIG. 4B illustrates a side view of a funnel/leg support that is hingedly attached to the funnel.

DETAILED DESCRIPTION

Figure 1:
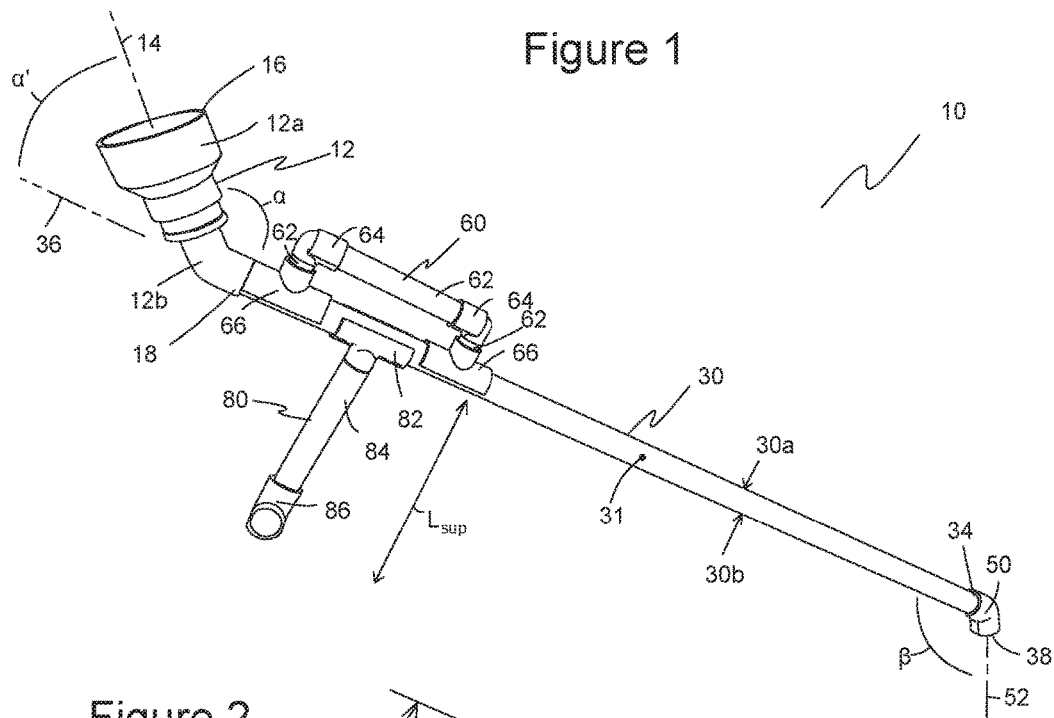
FIG. 1 illustrates a side view of one embodiment of a swimming pool funnel of the present invention for lifting an edge of a tensioned swimming pool cover showing an elongated funnel body, a funnel inlet end and a funnel outlet end.

Exemplary embodiments of the present invention are illustrated in FIGS. 1-6. FIG. 1 illustrates a side view of one embodiment of a swimming pool funnel 10 of the present invention. Funnel 10 is also illustrated in a front perspective view in FIG. 2 and in FIG. 3 which shows a view looking into swimming pool funnel 10 from above and behind funnel 10.

Swimming pool funnel 10 has a hollow funnel body 12, a spout 30 having a proximal spout end 32 connected to hollow funnel body 12, and a funnel outlet tip 50 connected to or formed at a distal spout end 34. Hollow funnel body 12 extends along a central funnel axis 14 from a first open funnel end 16 to a second open funnel end 18. First open funnel end 16 is greater in perimeter size than second open funnel end 18. Funnel body 10 reduces in cross-sectional size between the first open funnel end 16 and the second open funnel end 18, such as by stepped reductions in size or having a tapered sidewall that gradually reduces in cross-sectional size along the central funnel axis 14.

In one embodiment, funnel body 12 has a circular cross-sectional shape. Other cross-sectional shapes are acceptable. The cross-sectional shape of funnel body 12 may change from first open funnel end 16 to second open funnel end 18. In one embodiment, for example, first open funnel end 16 defines a square or rectangular opening and second open funnel end 18 defines a circular opening, where funnel body 12 gradually and smoothly transitions from one cross-sectional shape to the other.

In one embodiment, for example, funnel body 12 is made of schedule-40 polyvinylchloride pipe and pipe fittings with a 45° elbow 12b connected to a 1"×3" reducer fitting 12a. The fittings may be fixedly connected using solvent or adhesive. Alternately, the fittings are secured using threaded connections. When first open funnel end 16 has a diameter of about three inches, funnel 10 provides an easy target for the user to pour chemicals without spilling. In other embodiments, first open end 16 is larger or smaller than the three-inch diameter.

Figure 5:
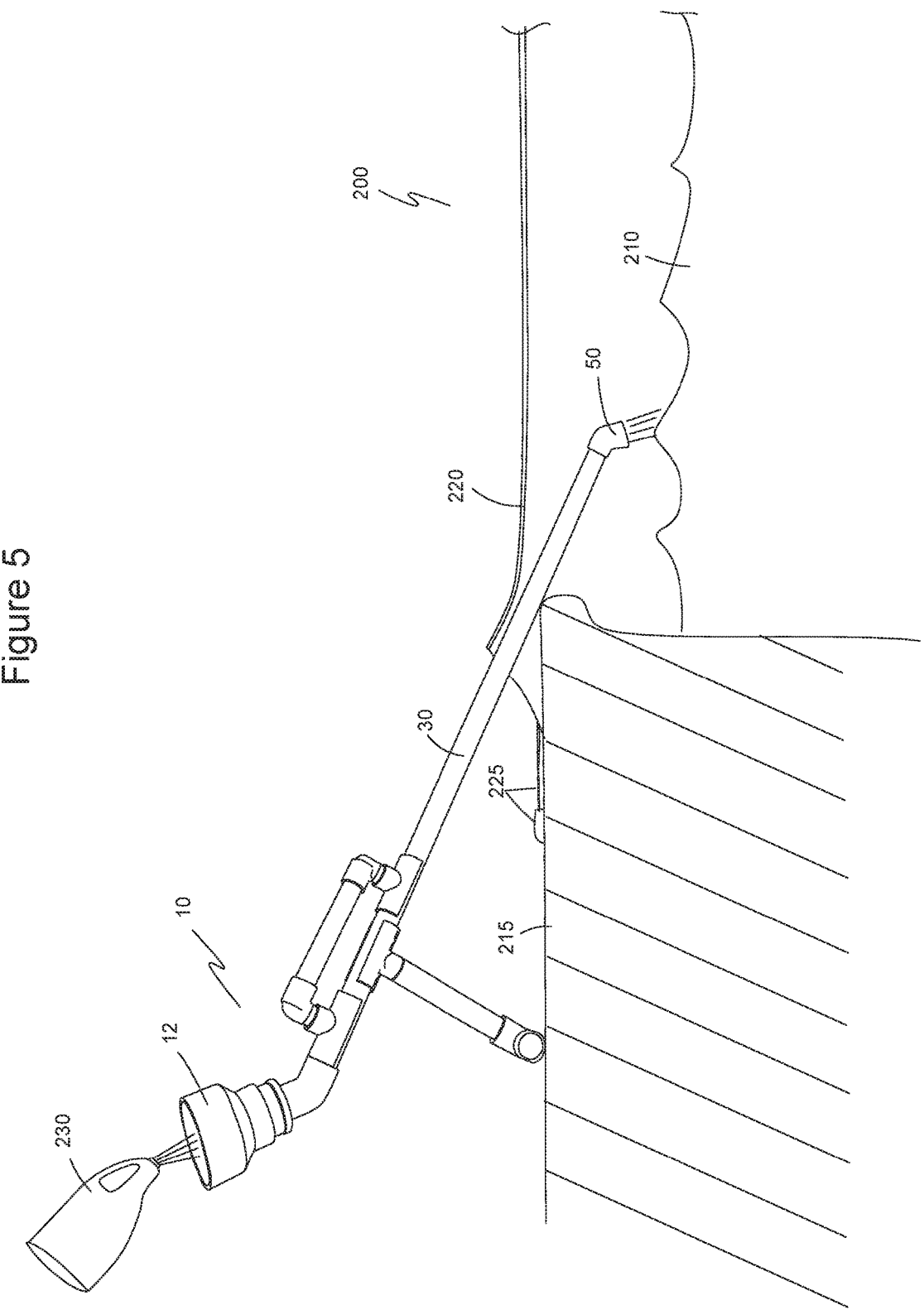
FIG. 5 illustrates a cross-sectional view of a covered swimming pool showing one embodiment of a funnel in use.

Elongated spout 30 is made of a rigid material and having a proximal spout end 32 connected to second open funnel end 18 of the funnel body 12. Spout 30 extends along a central spout axis 36 to a distal spout end 34 defining an opening 38. Central funnel axis 14 and central spout axis 36 define a body angle α from 100 to about 150 degrees as measured along a top surface 30a of spout 30. In one embodiment, body angle α is 135 degrees (or its complement α' is 45 degrees). As with funnel body 12, one embodiment of spout 30 is made of schedule-40 polyvinylchloride pipe or other suitable materials having a wall thickness sufficient to resist leaching of the spout by the sodium hypochlorite and other pool chemicals where such leaching causes brittleness and susceptibility to cracking, leaking and/or breaking. In some embodiments, spout 30 is made with a single length of pipe to avoid joints or seams that may leak over time. Other materials and pipe sizes are acceptable provided that the material is compatible with sodium hypochlorite ("bleach") and other pool chemicals. Schedule-40 pipe has been shown to have adequate rigidity to be used as a lever to prop up the edge of a pool cover and not yield to the weight of the pool cover when at-tension during use, such as shown in FIG. 5.

In another embodiment, distal spout end 34 has a funnel outlet tip 50 extending along a tip axis 52 that defines a tip angle 13 from about 100 to 150 degrees. Funnel outlet tip 50 is constructed and configured to direct fluid to exit substantially along the tip axis 52. In one embodiment, funnel outlet tip 50 is made from a 45° elbow fitting that is secured to distal spout end 34 and oriented to point vertically downwards when funnel 10 is used as shown, for example, in FIG. 5 with spout 30 supported by an optional funnel support 80 and spout 30 extending downward over the pool deck 215 towards the water 210. In other embodiments, funnel outlet tip 50 is formed with spout 30. In some embodiments, central body axis 14 and tip axis 52 are spaced-apart by spout 30 and extend parallel to each other, where tip angle 13 is the same as body angle α. For example, when central funnel axis 14 extends vertically, tip axis 52 is also vertical or near-vertical and, as shown in FIG. 5, first open funnel end 16 points in an upward orientation while opening 38 of distal spout end 34 points in a downward orientation.

Figure 2:
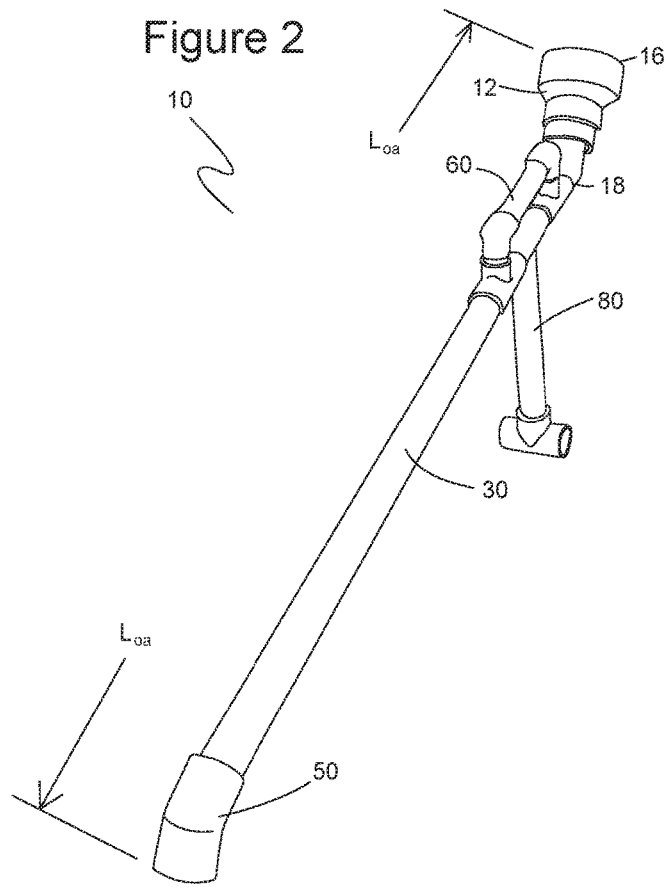
FIG. 2 illustrates a front perspective view of the swimming pool funnel of FIG. 1.
Figure 3:
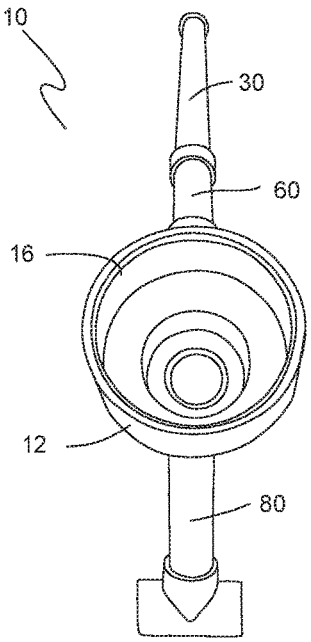
FIG. 3 illustrates a top and rear view showing a view looking into the funnel inlet end and the funnel body of FIG. 1.

In one embodiment, funnel 10 includes an optional handle 60 attached to spout 30 between funnel body 12 and a midpoint 31 of spout 30. The position of optional handle 60 is selected to provide a user with the greatest amount of leverage for lifting an edge of the tensioned swimming pool cover 220 shown in FIG. 5. In some embodiments, handle 60 is constructed of a straight section of pipe 62, 90° elbows 64, and fittings 66. Fittings 66 may be snap-on fittings or may be glued-on fittings. Snap-on fittings 66 are sometimes referred to as a "pipe snap T," where snap-on fittings 66 have a T shape and receive a short length of pipe 62 to join to elbows 64. Snap-on fittings 66 optionally are fixedly attached to a top surface 30a of spout 30 using solvent welding or adhesive. In other embodiments, snap-on fittings 66 are removable. The use of snap-on fittings 66, rather than pipe fittings, eliminates joints along spout 30 that could leak. As shown in FIGS. 1-3, handle 60 extends up from a top side 30a of spout 30 with pipe 62 extending along spout 30. In some embodiments, one of fittings 66 is adjacent elbow 12b of funnel body 12. When positioned between midpoint 31 and funnel body 12, handle 60 is conveniently located at or near the center of gravity of funnel 10 and facilitates the user in carrying funnel 10 to various positions around the swimming pool. Handle 60 is also useful for stabilizing funnel 10 while pouring chemicals into funnel body 12.

In yet other embodiments of swimming pool funnel 10, a funnel support 80 is fixedly or removably attached to spout 30 between funnel body 12 and midpoint 31 of spout 30, where funnel support 80 extends transversely from spout 30 and is constructed to elevate and support funnel body 12 above the ground with spout 30 extending downward so that a user does not have to hold the funnel 10 against the spring tension of the pool cover imparted onto spout 30 during use of swimming pool funnel 10. In one embodiment, support 80 is a leg that attaches to spout 30 using a snap-on fitting 82 similar to those described for handle 60. For example, support 80 comprises snap-on fitting 82 connected to a leg 84 made with length of pipe, and a foot 86 made with a T-fitting. For example, funnel support 80 has an overall length $L_{sup}$ of about nine inches. In one embodiment, funnel support 80 is attached between snap-on fittings 66 of handle 60. Other constructions of funnel support 80 are acceptable and include a bipod and folding support leg(s). Funnel support 80 may be attached using other methods, including a clamp, a strap, adhesive, magnetic attraction to a base 88 secured to spout 30, a slip fit between a leg and the base, and threaded connections. Support 80 may also be hingedly attached to spout 30 so that support 80 is positioned parallel to spout 30 for storage and/or carrying purposes yet easily positioned to support spout 30 and the tension of swimming pool cover 220.

Exemplary embodiments of swimming pool funnel 10 are made with schedule-40 PVC pipe and pipe fittings. In one embodiment, spout 30 is made with pipe having a diameter of one inch. Other materials and sizes are acceptable. In one embodiment, swimming pool funnel 10 has an overall length $L_{oa}$ of about 56 inches as measured from tip 52 to funnel body 12. In other embodiments, the overall length $L_{oa}$ is about 47-48 inches. Overall length Loa may be larger or smaller, but is selected in some embodiments to maintain the retail length to no more than 48 or 60 inches overall. When overall length $L_{oa}$ is about 56 inches and spout 30 is made of a rigid material, funnel 10 has structure sufficiently rigid to use funnel 10 to lift a pool cover 220 and support the edge of a pool cover 220 (shown in FIG. 5) in a raised position during use. Also, an overall length Loa of at least three feet positions the user a safe distance from the edge of the pool while adding chemicals.

Figure 4:
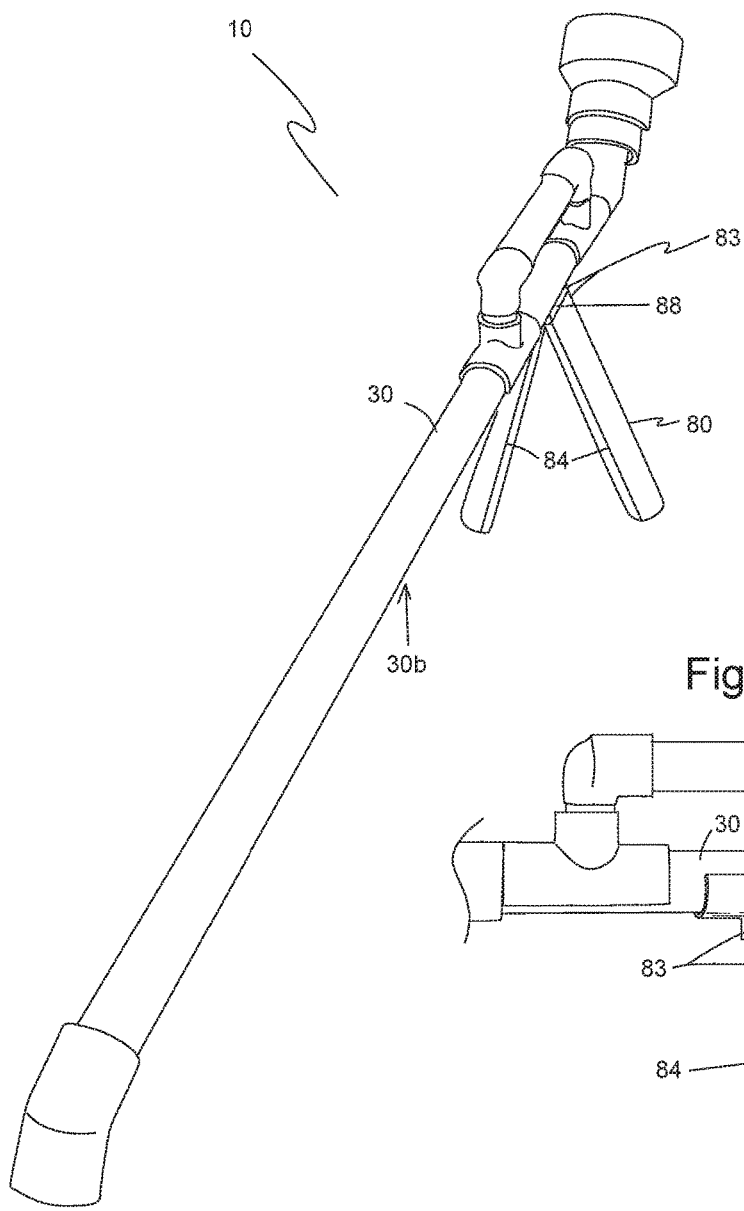
FIG. 4 illustrates a front perspective view of another embodiment of a swimming pool funnel showing one or more leg supports attached to a portion of the funnel body.

Referring now to FIG. 4, a front perspective view of funnel 10 shows funnel support 80 constructed with one embodiment of a retention structure 83 between funnel support 80 and spout 30. In one embodiment, retention structure 83 includes a support base 88 secured to spout 30. In one embodiment, support base 88 is secured to a bottom surface 30b of by adhesive or straps extending circumferentially around spout 30. Funnel support 80 has two legs 84 that each attach to base 88 using fasteners, threaded fitting, slip fitting, or magnetic attraction to base 88. In some embodiment, legs 84 are hingedly or pivotably attached to base 88, thereby allowing legs 84 to fold along spout 30 for storage and fold to extend transversely from spout 30 for use.

Figure 4A:
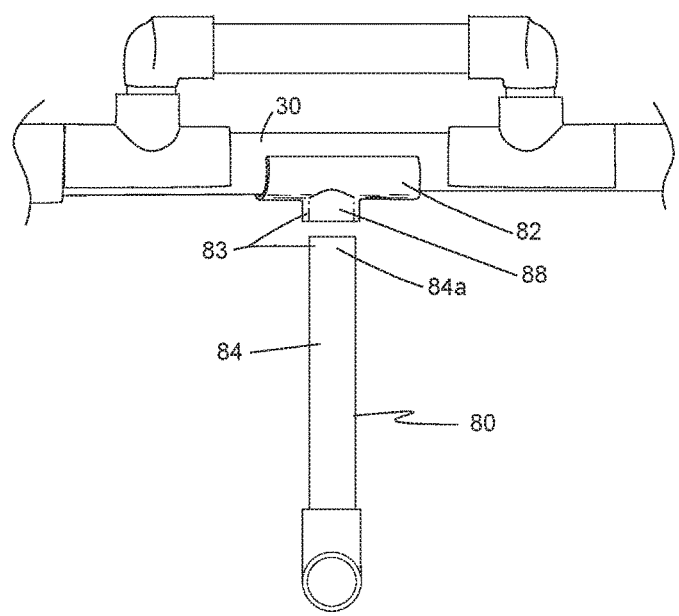
FIG. 4A illustrates a side view of part of another embodiment of a swimming pool funnel of the present invention showing examples of retention structures that connect a leg support and/or handle to the funnel body.

FIG. 4A illustrates a side view of part of funnel 10 with one embodiment of a retention structure 83 between spout 30 and support 80. In FIG. 4A, funnel support 80 is shown detached from support base 88, which is part of snap-on fitting 82 attached to spout 30. An end portion 84a of leg 84 fits into base 88 with a slip fit or threaded engagement. In other embodiments, base 88 is ferromagnetic (e.g., contains a magnet) and an end portion 84a of leg 84 is made with a ferromagnetic material or contains a ferromagnetic member, such as a steel plate. Accordingly, leg 84 is removably retained on base 88 by magnetic attraction between leg 84 and base 88. In FIG. 4B, funnel support 80 is hingedly attached by a hinge structure 89 to spout 30 or support base 88, which allows funnel support 80 to be swung up to a storage position where funnel support 80 is substantially parallel to spout 30 and may be held in such a storage position using known techniques (i.e. magnetics, snaps, clips, straps, and the like) until required for use.

Referring now to FIG. 5, a cross-sectional view of part of a pool 200 shows an embodiment of swimming pool funnel 10 in use with a covered swimming pool 200. Pool 200 is filled with water 210 and is surrounded by a pool deck 215. A pool cover 220 extends over water 210 and is secured along its perimeter using spring-tensioned straps 225. Spout 30 of funnel 10 extends between pool cover 220 and pool deck 215 by slightly lifting pool cover 220 above pool deck 215. Chemicals 230 are poured into funnel body 12 and are dispensed into water 210 from funnel outlet tip 50.

Figure 6:
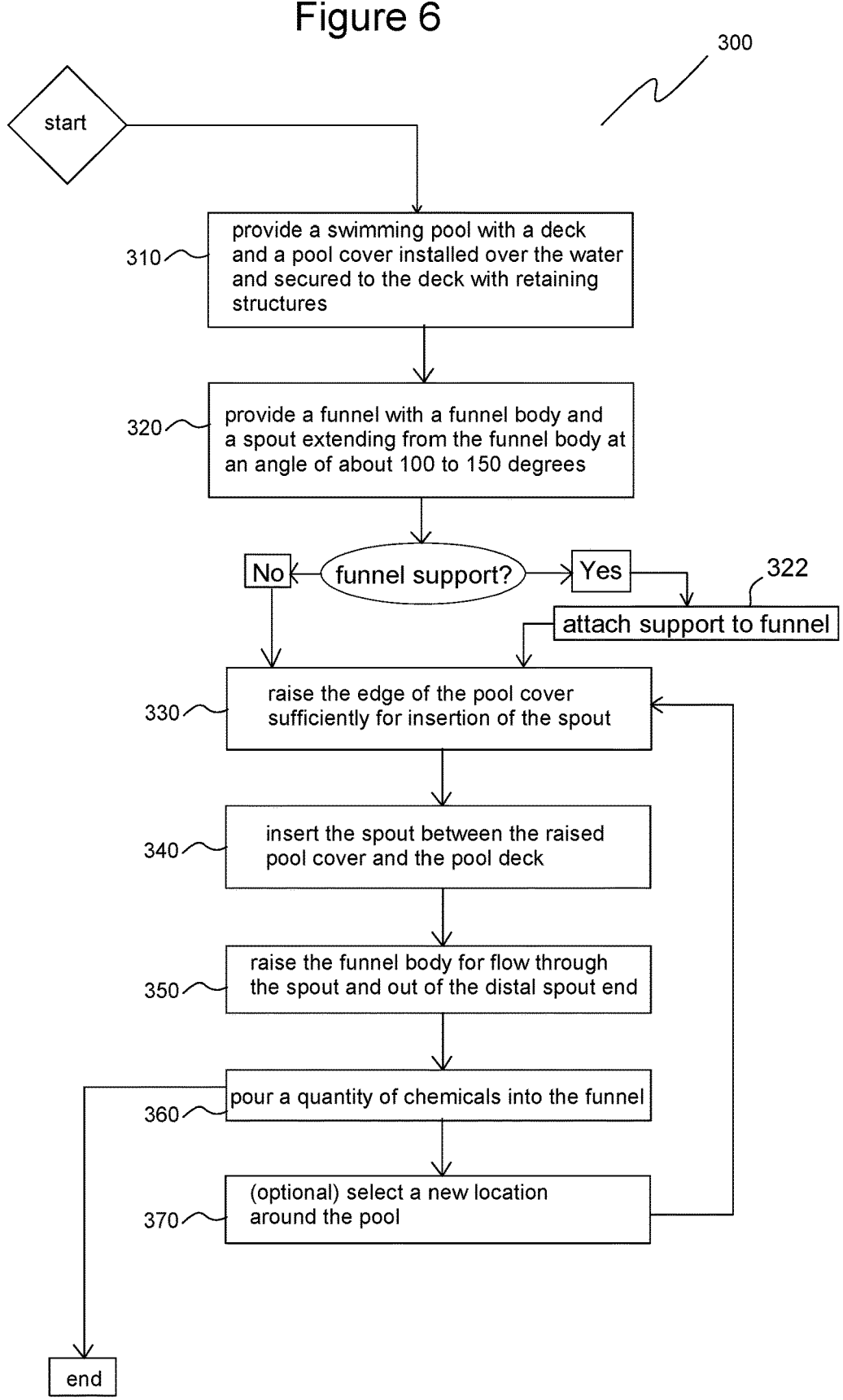
FIG. 6 illustrates a flow chart showing steps in one embodiment of a method of adding chemicals to a covered swimming pool.

Referring now to FIG. 6, a flow chart illustrates steps in an exemplary embodiment of a method 300 of adding chemicals 230 to a swimming pool 200 that is covered with a pool cover 220.

In step 310, a swimming pool 200 is provided, where the swimming pool 200 has a pool deck 215 and a pool cover 220 installed over the water 210 using retaining structures 225 between the pool cover 220 and the pool deck 215. For example, the retaining structures 225 are spring-tensioned straps connected to the pool cover 220 and constructed to attach to anchors embedded in the pool deck 215.

In step 320, a swimming pool funnel 10 is provided, where funnel 10 includes a hollow funnel body 12 extending along a central funnel axis 14 from a first open end 16 to a second open end 18. The first open end 16 is greater in size than the second open end 18 and the funnel body 12 reduces in cross-sectional size between the first open end 16 and the second open end 18. The funnel 10 also has an elongated spout 30 made of a rigid material and having a proximal spout end 32 connected to the second open end 18 of the funnel body 12. The spout 30 extends transversely along a central spout axis 36 to a distal spout end 34 defining an opening 38. The central funnel axis 14 and the central spout axis 36 define a body angle α from 100 to about 150 degrees. In some embodiments, the body angle α is about 135°.

In some embodiments, step 320 includes selecting funnel 10 to have a support 80 attached or attachable to the spout 30 between the funnel body 12 and a midpoint 31 of the spout 30. When funnel 10 includes a removable support 80, the user attaches support 80 in step 322.

In some embodiments, step 320 includes the step of selecting the funnel 10 having a hollow tip 50 on the distal spout end 34 and extending along a tip axis 52 that defines a tip angle 13 with the central spout axis 36 from about 100 to 150 degrees, where the tip 50 directs fluid to exit the spout 30 along the tip axis 52.

In some embodiments, step 320 includes selecting the funnel 10 to include a handle 60 attached to the spout 30 between the funnel body 12 and a midpoint 31 of the spout 30. For example, handle 60 is spaced vertically above and extends over a top surface 30a of the spout 30.

In step 330, an edge of the pool cover 220 is raised sufficiently to insert the elongated spout 30 between the pool cover 220 and the pool deck 215 without detaching any retaining structures 225 used to secure the pool cover 220. In some embodiments, the user uses spout 30 as a lever to raise the pool cover 220.

In step 340, the spout 30 is inserted between the pool cover 220 and the pool deck 215 with the tip 52 positioned in or above the water 210.

In step 350, the funnel body 12 is raised so the chemical 230 will flow through the funnel 10 and into the pool 200. In one embodiment, step 350 includes positioning the funnel 10 on a support 80 to elevate the funnel body 12 above the pool deck 215.

In step 360, the user pours a quantity of liquid chemical 230 into the funnel body 12 through the first open end 16, thereby dispensing the quantity of chemical 230 into the swimming pool 200 via the spout 50. For example, chemical 230 is sodium hypochlorite ("bleach").

In optional step 370, the user moves the funnel 10 to another location around the pool 200 and performs steps 330 through 360. Step 370 may be repeated as needed to add chemicals 230 as desired.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A swimming pool funnel comprising:
   a hollow funnel body extending along a central funnel axis from a first open funnel end to a second open funnel end, wherein the funnel body reduces in cross-sectional size from the first open funnel end to the second open funnel end;
   an elongated spout made of a rigid material and having a proximal spout end connected to the second open funnel end of the funnel body in a leak-proof fashion, the elongated spout extending along a central spout axis to a distal spout end defining an opening, wherein the central funnel axis and the central spout axis define a body angle from about 100 degrees to about 150 degrees.

2. The funnel of claim 1 further comprising a hollow tip on the distal spout end, wherein the funnel outlet tip extends along a tip axis that defines a tip angle with the central spout axis from about 100 to 150 degrees, wherein the funnel outlet tip directs fluid to exit the spout along the tip axis.

3. The funnel of claim 2, wherein the tip angle is the same as the body angle.

4. The funnel of claim 1 further comprising a handle attached to the spout between the funnel body and a midpoint of the spout.

5. The funnel of claim 4, wherein the handle extends up from a top surface of the spout.

6. The funnel of claim 1 further comprising a funnel support removably attachable to the spout between the funnel body and a midpoint of the spout, the funnel support constructed to extend transversely from the spout and elevate the funnel body with the distal spout end extending downward.

7. The funnel of claim 6, wherein the funnel support is a two-legged support.

8. The funnel of claim 6, wherein the funnel support comprises at least one support leg attachable to a base wherein the base is secured to the elongated spout.

9. The funnel of claim 8, wherein the at least one support leg is retained by the base by magnetic attraction.

10. The funnel of claim 1 further comprising a funnel support fixedly attached to the spout between the funnel body and a midpoint of the spout, the support constructed to extend transversely from the spout and elevate the funnel body with the distal spout end extending downward.

11. The funnel of claim 10, wherein the support is a two-legged support.

12. The funnel of claim 1, wherein the funnel has an overall length in the range of 36 inches to 56 inches.

13. The funnel of claim 12 wherein the overall length is 56 inches.

14. A method of adding chemicals to a swimming pool comprising:
   providing a swimming pool with a pool deck and a pool cover installed in a tensioned orientation over the water using retaining structures between the pool cover and the pool deck;
   providing a funnel comprising:
      a hollow funnel body extending along a central funnel axis from a first open funnel end to a second open funnel end, wherein the funnel body reduces in cross-sectional size from the first open funnel end to the second open funnel end; and
      an elongated spout made of a rigid material and having a proximal spout end connected to the second open funnel end of the funnel body. the elongated spout extending along a central spout axis to a distal spout end defining an opening, wherein the central funnel axis and the central spout axis define a body angle from 100 degrees to 150 degrees;

inserting the elongated spout between the tensioned pool cover and the pool deck without detaching any retaining structures and leveraging the funnel to raise an edge of a tensioned pool cover sufficiently to cause the funnel to be inclined in an upward orientation from the spout distal end to the funnel body; and pouring a quantity of liquid chemical into the funnel body through the first open funnel end, thereby dispensing the quantity of chemical into the swimming pool via the spout without releasing any portion of the tensioned pool cover from a corresponding retaining structure.

15. The method of claim 14 further comprising:

positioning a funnel support relative to the spout between the funnel body and a midpoint of the spout wherein the funnel support extends transversely from the spout; and resting the leveraged funnel onto the funnel support to maintain the incline of the funnel in an upward orientation above the pool deck.

16. The method of claim 14, wherein the step of providing the funnel includes selecting the funnel to include a support attached to the spout between the funnel body and a midpoint of the spout, the support constructed to extend transversely from the spout and elevate the funnel body with the distal spout end extending downward; and wherein the method further comprises the step of positioning the support to elevate the funnel body above the pool deck.

17. The method of claim 14, wherein the step of providing the funnel includes selecting the funnel having a hollow tip on the distal spout end and extending along a tip axis that defines a tip angle with the central spout axis from about 100 to 150 degrees, wherein the hollow tip directs fluid to exit the spout along the tip axis.

18. The method of claim 14, wherein the step of providing a funnel includes selecting the funnel to include a handle attached to the spout between the funnel body and a midpoint of the spout.

* * * * *